United States Patent
Shinohara et al.

(10) Patent No.: US 7,509,302 B2
(45) Date of Patent: Mar. 24, 2009

(54) DEVICE, METHOD AND PROGRAM FOR PROVIDING A HIGH-PERFORMANCE STORAGE ACCESS ENVIRONMENT WHILE ISSUING A VOLUME ACCESS REQUEST INCLUDING AN ADDRESS OF A VOLUME TO ACCESS

(75) Inventors: Daisuke Shinohara, Yokohama (JP); Shigeru Abe, Kawasaki (JP); Yuichi Taguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 352 days.

(21) Appl. No.: 11/011,139

(22) Filed: Dec. 15, 2004

(65) Prior Publication Data

US 2006/0085388 A1 Apr. 20, 2006

(30) Foreign Application Priority Data

Oct. 15, 2004 (JP) ............................. 2004-300935

(51) Int. Cl.
*G06F 7/00* (2006.01)

(52) U.S. Cl. ................. 707/2; 707/1; 707/10; 707/100; 707/200; 709/203; 711/1; 711/5; 711/100

(58) Field of Classification Search ........................ None
See application file for complete search history.

(56) References Cited

U.S. PATENT DOCUMENTS

| | | | | |
|---|---|---|---|---|
| 4,870,643 A | * | 9/1989 | Bultman et al. ................. | 714/7 |
| 4,986,668 A | * | 1/1991 | Fukushima et al. ...... | 369/47.14 |
| 6,094,318 A | * | 7/2000 | Kim ............................. | 360/60 |
| 6,629,264 B1 | * | 9/2003 | Sicola et al. ................... | 714/15 |
| 6,636,873 B1 | * | 10/2003 | Carini et al. ................. | 707/201 |
| 7,152,096 B2 | * | 12/2006 | Yamamoto et al. .......... | 709/215 |
| 2002/0184516 A1 | * | 12/2002 | Hale et al. ................... | 713/200 |
| 2003/0028729 A1 | * | 2/2003 | Yamamoto et al. .......... | 711/130 |
| 2004/0122832 A1 | * | 6/2004 | Heil ............................ | 707/100 |
| 2004/0128443 A1 | * | 7/2004 | Kaneda et al. ............... | 711/114 |

FOREIGN PATENT DOCUMENTS

JP 2003-114823 4/2003

* cited by examiner

*Primary Examiner*—Hung Q Pham
*Assistant Examiner*—Hubert Cheung
(74) *Attorney, Agent, or Firm*—Mattingly, Stanger, Malur & Brundidge, P.C.

(57) ABSTRACT

The present invention provides a high-performance storage access environment to a user who moves around a wide area, while increasing the fault resistance of the system. A plurality of network storages (volumes) is assigned to the user. Then, at the occasion of logging in to a volume by the user, the volume that can be accessed with high performance from a position he made access is located. Addresses at a computer with which user makes access are associated with addresses of the volumes provided by a storage device in advance in an assigned volume management table so as to increase access performance. Then, a management server performs control so that the address of the volume associated with the user access position is returned as a response, at the time of logging in.

11 Claims, 11 Drawing Sheets

FIG.2

ASSIGNED VOLUME MANAGEMENT TABLE 38

| USER ID | TRANSMISSION SOURCE ADDRESS | FORWARDING ADDRESS | VOLUME ID |
|---|---|---|---|
| User1 | Location1 | Location1_User1 | VOLUME 101 |
| User1 | Location2 | Location2_User1 | VOLUME 201 |
| User2 | Location1 | Location1_User2 | VOLUME 102 |
| User2 | Location2 | Location2_User2 | VOLUME 202 |

381 382 383 384

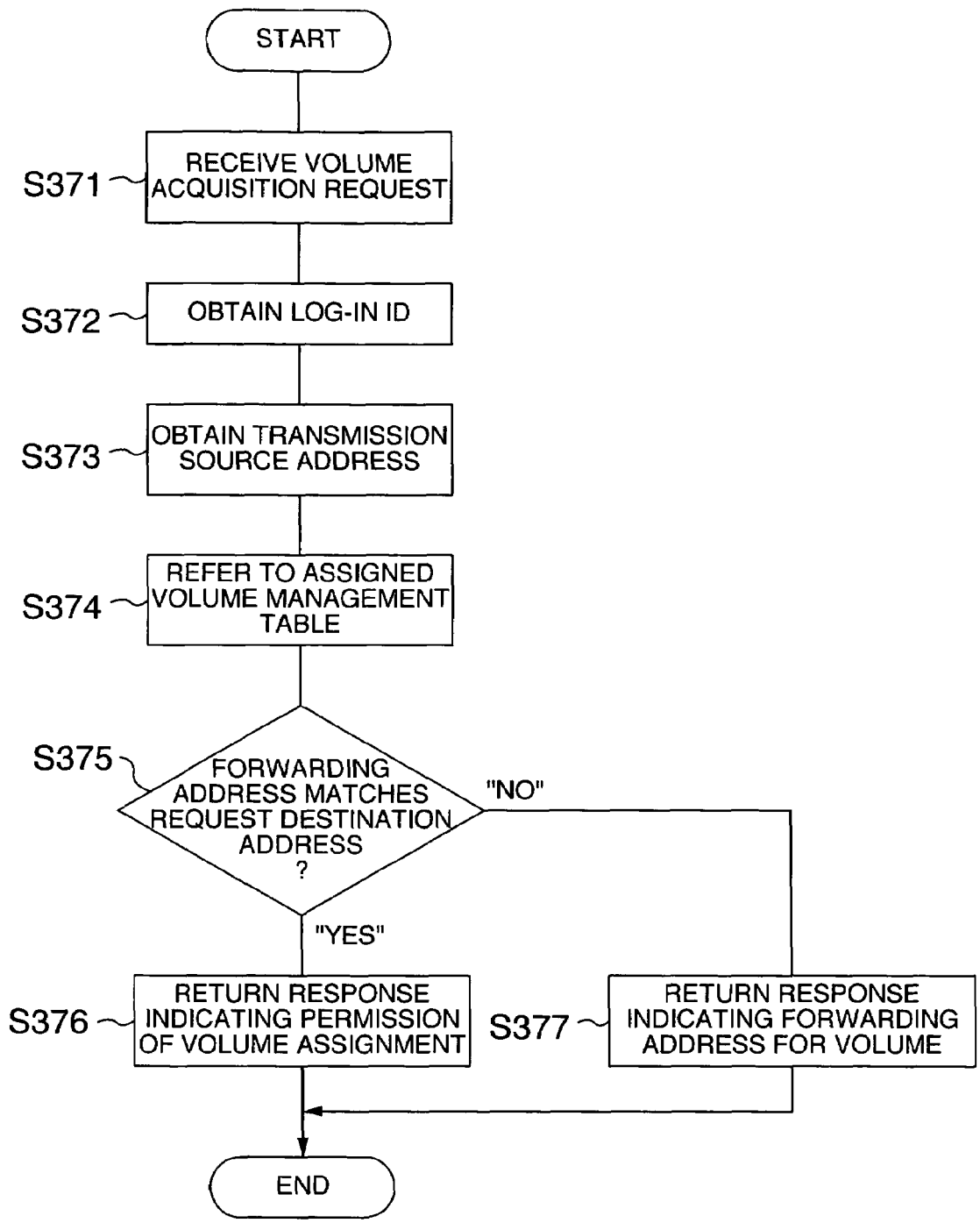

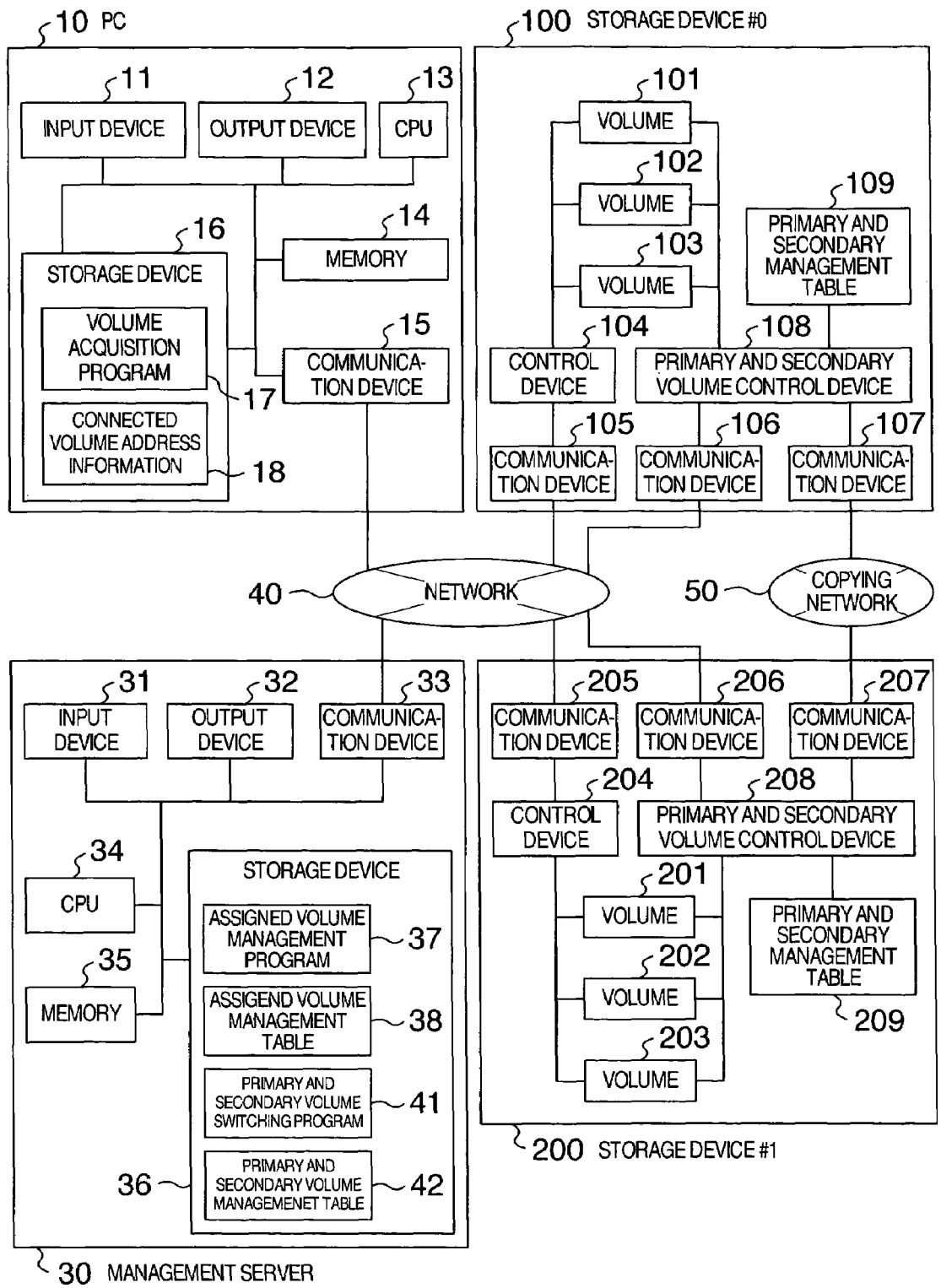

FIG.8

PRIMARY AND SECONDARY VOLUME MANAGEMENT TABLE 42

| VOLUME ID | PAIR ATTRIBUTE | PAIR VOLUME ID |
|---|---|---|
| VOLUME 101 | Primary | VOLUME 201 |
| VOLUME 102 | Primary | VOLUME 201 |
| VOLUME 201 | Secondary | VOLUME 101 |
| VOLUME 202 | Secondary | VOLUME 102 |

FIG.9

| VOLUME ID | PAIR ATTRIBUTE | PAIR VOLUME ID |
|---|---|---|
| VOLUME 101 | Primary | VOLUME 201 |
| VOLUME 102 | Primary | VOLUME 202 |
| VOLUME 103 | Primary | VOLUME 203 |

FIG.10

| VOLUME ID | PAIR ATTRIBUTE | PAIR VOLUME ID |
|---|---|---|
| VOLUME 201 | Secondary | VOLUME 101 |
| VOLUME 202 | Secondary | VOLUME 102 |
| VOLUME 203 | Secondary | VOLUME 103 |

DEVICE, METHOD AND PROGRAM FOR PROVIDING A HIGH-PERFORMANCE STORAGE ACCESS ENVIRONMENT WHILE ISSUING A VOLUME ACCESS REQUEST INCLUDING AN ADDRESS OF A VOLUME TO ACCESS

INCORPORATION BY REFERENCE

The present application claims priority from Japanese application JP2004-300935 filed on Oct. 15, 2004, the content of which is hereby incorporated by reference into this application.

BACKGROUND

The technology disclosed in the present specification and attached drawings relates to a storage management device, a storage network system, a storage management method, and a storage management program.

With development of information technology, a demand for greater efficiency of data management has increased. Under such a background, a technology for connecting storages to a network to share volumes, as disclosed in columns from "0004" to "0014" and FIG. 1 in JP-A-2003-114823 (corresponding to U.S. 2003/0028729A1), for example, has developed. Further, a wider storage network that utilizes IPs (Internet Protocols) has been implemented. With the wider storage network described above, use of a storage from a remote site and construction of a system used between remote sites for disaster recovery have become active.

SUMMARY

According to the technology disclosed in JP-A-2003-114823, by combining various programs, improvement in access performance to a volume used by a user can be achieved.

However, a lot of programs for constituting the system mean that there are many elements to be controlled. Thus, the system becomes complex. As the system becomes more complex, fault resistance of the system is reduced, as is known.

A challenge of the present invention is to provide a storage management device, a storage network system, a storage management method, and a storage management program that can provide a high-performance storage access environment to a user who moves around a wide area while enhancing the fault resistance of the system.

In one aspect of the present invention, a plurality of volumes is assigned to the user. Then, at the occasion of logging in to a network storage by the user, the volume that can be accessed with high performance by the user from a position at which he made access is assigned, or access to the volume is permitted to the user who performed logging in. For this purpose, addresses at a computer with which the user makes access to a storage system are associated with addresses of the volumes to be provided, in advance, in an address management table stored in a storage device in a storage management device so as to increase access performance. Then, the address of the volume associated with the user access position is returned as a response, at the time of the access.

According to the aspect of the present invention, when the user has logged in to a network storage, a high-performance access environment can be provided just by inquiring the storage management device of the address of a volume to be accessed. With this arrangement, the high-performance network storage access environment can be provided to the user who moves around a wide area.

Other objects, features and advantages of the invention will become apparent from the following description of the embodiments of the invention taken in conjunction with the accompanying drawings.

BRIEF DESCRIPTION OF THE DRAWINGS

FIG. 2 is a table showing an example of a data structure of an assigned volume management table according to the embodiment of the present invention shown in FIG. 1;

FIG. 6 is a flowchart showing a flow of processing by an assigned volume management program according to the embodiment of the present invention shown in FIG. 1;

FIG. 7 is a block diagram showing a network storage system according to other embodiment of the present invention;

FIG. 8 is a table showing an example of a data structure of a primary and secondary volume management table according to the embodiment of the present invention shown in FIG. 7;

FIG. 9 is a table showing an example of a data structure of a primary and secondary management table shown in FIG. 7;

FIG. 10 is a table showing an example of a data structure of a primary and secondary management table shown in FIG. 7;

DESCRIPTION OF THE EMBODIMENTS

Embodiments of the present invention will be described below with reference to the drawings.

Figure 1:
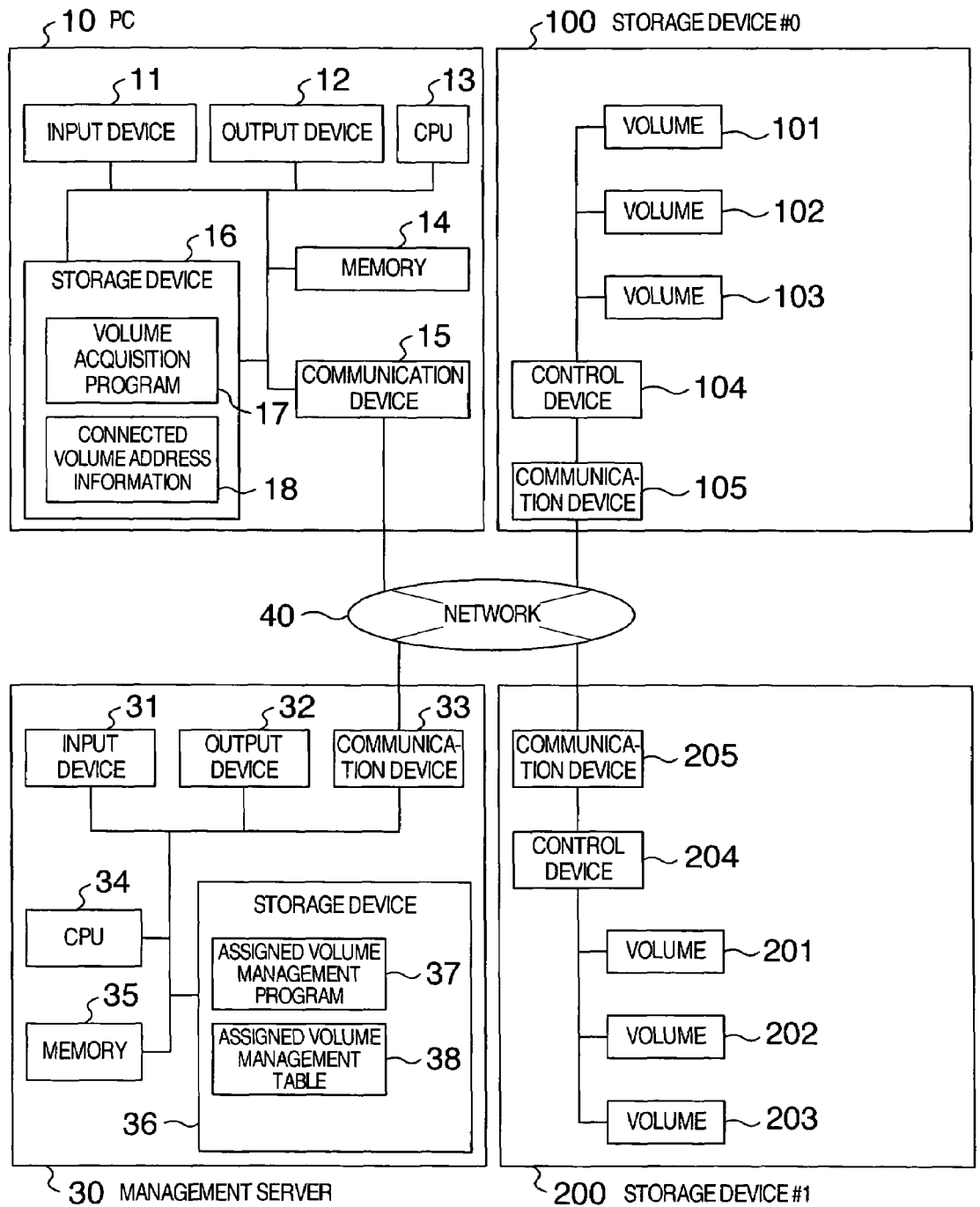
FIG. 1 is a block diagram showing a network storage system according to an embodiment of the present invention.

FIG. 1 is a block diagram showing a network storage system according to an embodiment of the present invention.

Referring to FIG. 1, a PC (Personal Computer) 10, a management server 30 that serves as a storage management device, and storage devices 100 and 200 constituting storage systems, both marked with #0 and #1, respectively, are connected through a network 40 such as an IP network.

The PC 10 is constituted from an input device 11, an output device 12, a CPU (Central Processing Unit) 13, a memory 14, a communication device 15, and a storage device 16 such as a hard disk. A volume acquisition program 17 is the program stored in the storage device 16, and after read into the memory 14, the volume acquisition program 17 is executed sequentially by the CPU 13. The volume acquisition program 17 is the program for acquiring a volume or requesting assignment of the volume through the network 40 connected to the PC 10. Address information 18 of the storage devices 100 and 200 connected to the PC is registered in advance in the volume acquisition program 17.

Both of the storage devices 100 and 200 have communication devices 105 and 205, respectively, control devices 104 and 204 for performing read and write controls over volumes, respectively, and a plurality of volumes. Referring to FIG. 1, the storage device 100 includes volumes 101 to 103, and the storage device 200 includes volumes 201 to 203. Though three volumes are shown in the respective storage devices herein, the number of the volumes is arbitrary, and the number of the storage devices connected to the network 40 is also arbitrary.

The management server 30 is constituted from a communication device 33, an input device 31, an output device 32, a CPU 34, a memory 35, and a storage device 36. An assigned volume management program 37 is the program stored in the storage device 36, and after read into the memory 35, the assigned volume management program 37 is executed by the CPU 34. The assigned volume management program 37 is the program for acquiring information on an assigned volume corresponding to its location on the PC 10 by referring to an assigned volume management table 38 as a first address management table indicating the correspondence relationships between access positions such as transmission source addresses on the PC 10 and assigned volumes that can be used.

FIG. 2 is a table showing an example of a data structure on the assigned volume management table 38. The assigned volume management table 38 has a user ID 381 for identifying a user who uses a volume, a transmission source address 382 used when the PC 10 has transmitted a request for using the volume, a forwarding address 383 indicating the address of the volume to be used when the PC 10 is located at the transmission source address, and a volume ID 384 associated with the forwarding address 383 as respective data items thereof.

When a user with his user ID being User 1 has transmitted a request for acquiring a volume from Location 1, for example, it indicates that the volume 101 with its address represented by Location 1_User 1 is used. When the same user has transmitted a request for acquiring a volume from Location 2, it indicates that the volume 201 with its address represented by Location 2_User 1 is used.

Figure 3:
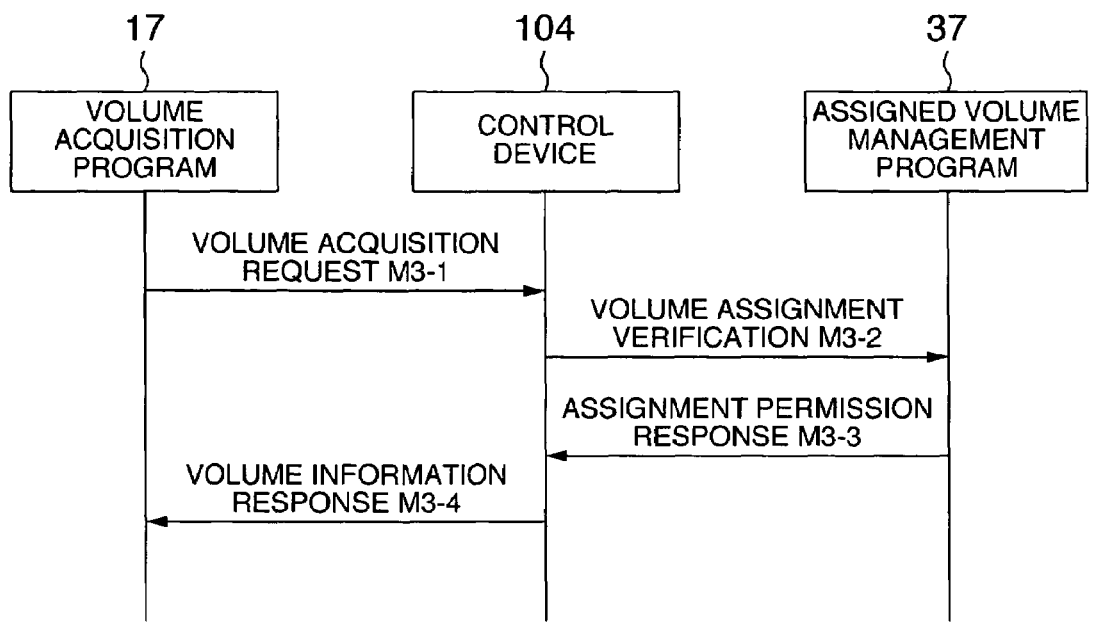
FIG. 3 is an operation sequence diagram according to the embodiment of the present invention shown in FIG. 1.

FIG. 3 is an operation sequence diagram according to the embodiment of the present invention shown in FIG. 1, and shows a schematic flow of processing when the storage device 100 receives a request for acquiring a volume from the PC 10 and permits access to the volume that is present inside the storage device 100.

First, the volume acquisition program 17 in the PC 10 transmits to the storage device 100 the request for acquiring information including information of the volume such as the user ID, transmission source address, the ID and the address of the volume to be used (M3-1). When the control device 104 of the storage device 100 thereby receives the request for acquiring the volume, the control device 104 transmits to the management server 30 a request for verifying assignment of the volume including information of the user ID, transmission source address, the volume to be used, and the request destination address (M3-2).

When the assigned volume management program 37 in the management server 30 has received the request for verifying assignment of the volume, the assigned volume management program 37 refers to the assigned volume management table 38, locates the forwarding address from the user ID and the transmission source address, and returns a response indicating permission of the assignment to the storage device 100 when the forwarding address matches the request destination address (M3-3). FIG. 3 shows a case where the assigned volume management program 37 returns the response indicating permission of the assignment.

When the control device 104 of the storage device 100 receives the response indicating permission of the assignment, the control device 104 makes a response indicating the information of the volume (M3-4) and permits access to the volume for which the request has been made. The PC 10 can thereby use the volume.

Figure 4:
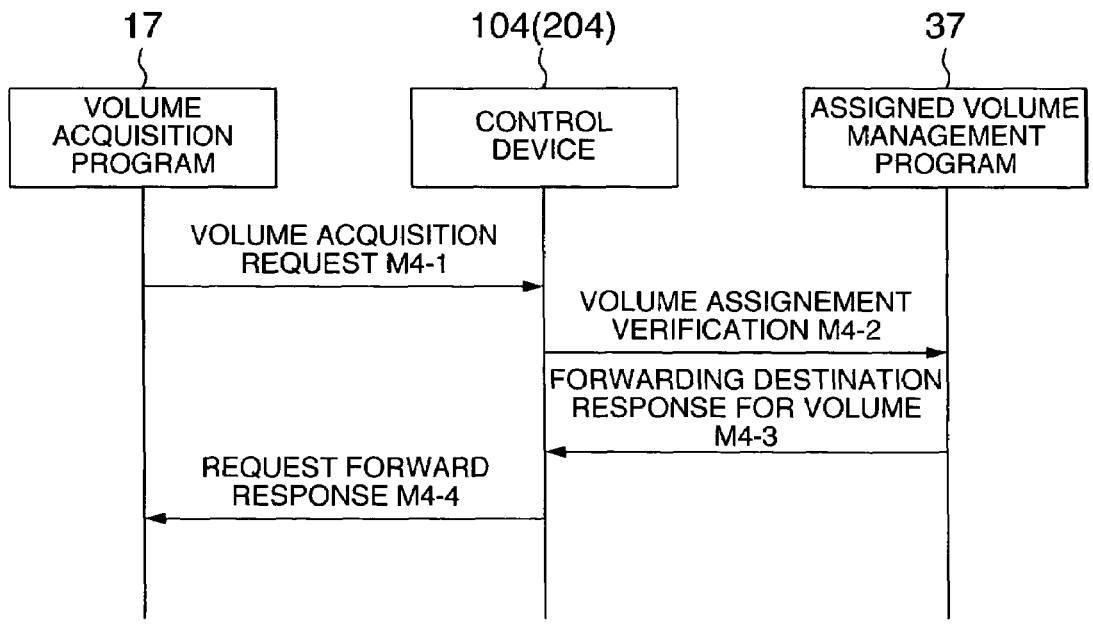
FIG. 4 is an operation sequence diagram according to the embodiment of the present invention shown in FIG. 1.

FIG. 4 is an operation sequence diagram according to the embodiment of the present invention shown in FIG. 1, and shows a schematic flow of processing when the storage device 100 has received from the PC 10 a request for acquiring a volume that is not present in the storage device 100.

The operation sequence diagram in FIG. 4 is different from the operation sequence diagram in FIG. 3 in the content of the response of the assigned volume management program 37. Since the forwarding address determined by the user ID and the transmission source address is different from the request destination address, the assigned volume management program 37 does not return the response indicating permission of assignment, but returns the forwarding address for the volume (M4-3: volume forwarding response). When the control device 104 of the storage device 100 receives the forwarding address, the control device 104 notifies the PC 10 of the forwarding address (M4-4: request forward response). When the PC 10 receives the forwarding address, the PC 10 issues a request for acquiring the volume to the storage device 200 specified by the forwarding address, which is different from the storage device 100 to which the original request has been made. The storage device 200, which is the forwarding destination, gives the response indicating information of the volume in the same procedure as that shown in FIG. 3. The PC 10 can thereby use the volume at the forwarding destination.

Incidentally, the same processing as at step M3-1 in FIG. 3 is executed at step M4-1, and the same processing as at step M3-2 in FIG. 3 is executed at step M4-2.

Figure 5:
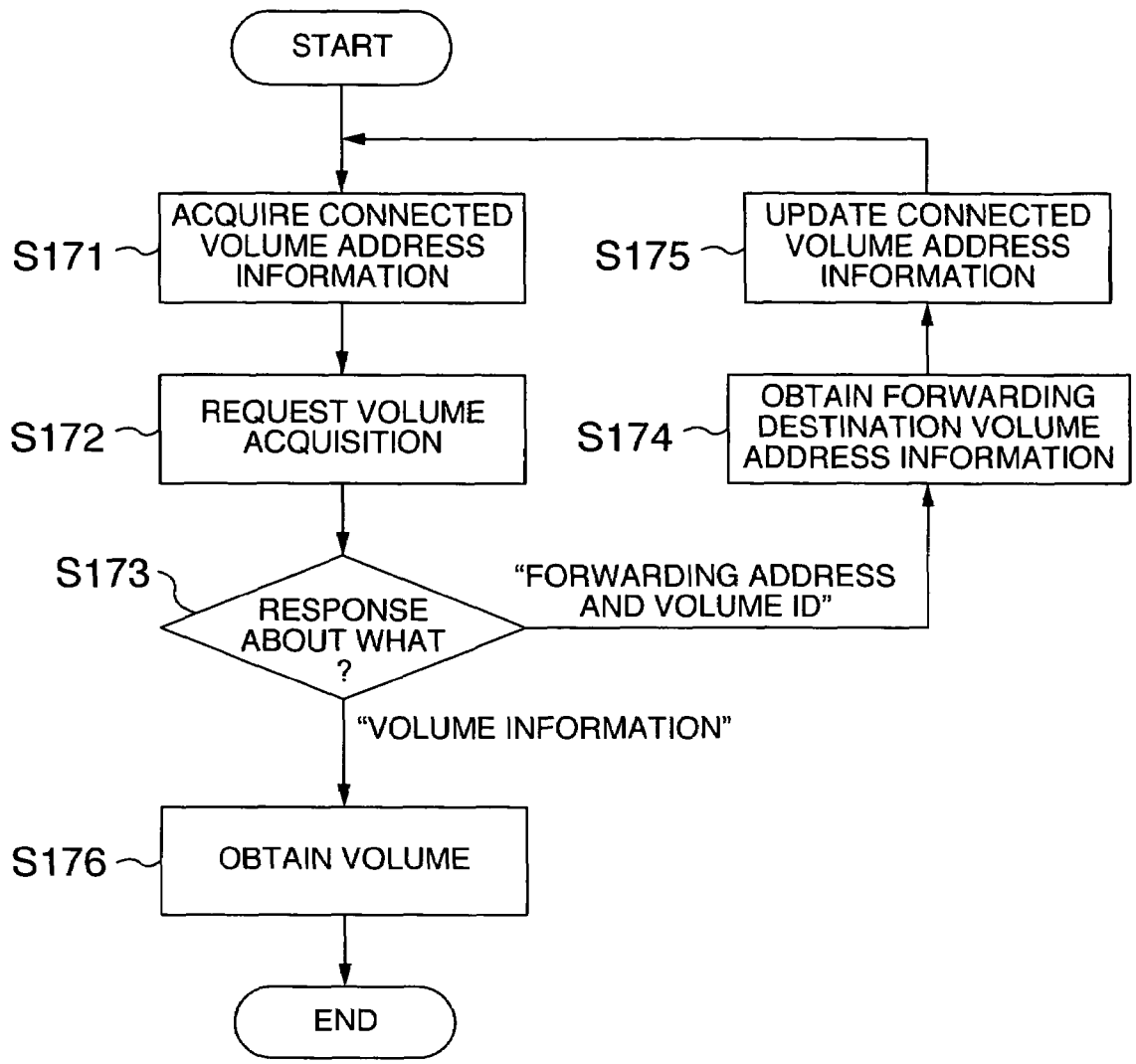
FIG. 5 is a flowchart showing a flow of processing by a volume acquisition program according to the embodiment of the present invention shown in FIG. 1.

FIG. 5 is a flowchart showing a flow of processing by the volume acquisition program. FIG. 6 is a flowchart showing a flow of processing by the assigned volume management program.

Referring to FIG. 5, the PC 10 first acquires address information of a connected volume, based on the address information stored in the memory 14 when access to the volume has been made last, at step S171. Then, the PC 10 transmits a request for acquiring the volume to the storage device such as the storage device 100, described in the connected volume address information, at step S172. That is, the PC 10 transmits the request for acquiring the volume to the volume in the storage device 100, accessed last.

When the response the PC 10 has obtained from the storage device 100 is the information of the volume or the volume information in the storage device 100 at step 173, or when the PC 10 is permitted from the storage device 100 to make access to the volume in the storage device 100, the PC 10 accesses the volume and acquires the volume, at step S176.

On the other hand, when the response which the PC 10 has obtained from the storage device 100 is the forwarding address and the ID of the volume at step S173, or when the PC 10 has received notification of the storage device other than the storage device 100 and the ID of the volume, the PC 10 updates the connected volume address information 18, based on the forwarding address and the ID of the volume received. That is, the PC 10 acquires forwarding destination volume address information at step S174, and updates the connected volume address information at step S175. Then, the PC 10 repeats processing that is the same as the processing after step S171. More specifically, the PC 10 transmits the request for acquiring the volume to the volume in the storage device such as the storage device 200 at the forwarding destination, and acquires the volume at step S176.

When the PC 10 acquires the volume from the volume in the storage device such as the storage device 200 at the forwarding destination, connecting path switch processing is executed. An environment in which the PC 10 can communicate with the storage device 200 at the forwarding destination is thereby made ready, for access.

Referring to FIG. 6, the management server 30 receives a request for acquiring a volume (request for verifying assignment of the volume) from the control device 104 of the storage device 100 at step S371. Then, the management server 30 acquires the log-in ID or user ID at step S372, acquires the transmission source address at step S373, and then refers to the assigned volume management table 38 based on the log-in ID or user ID and the transmission source address obtained, at step S374. Then, the management server 30 compares the address of the forwarding destination with the address of the request destination, at step S375. If the forwarding address matches the request destination address at step S375, the management server 30 returns the response indicating permission of the assignment of the volume to the storage device 100 to which the request has been made, at step S376. If the addresses do not match at step S375, the management server 30 returns the response indicating the forwarding address for the volume, at step S377. With this arrangement, the PC 10 can transmit the request for acquiring the volume to the storage device 100 or storage device 200 specified by the forwarding address, different from the storage device 100 to which the original request has been made.

According to this embodiment, depending on the address of the PC 10 operated by a user who moves around a wide area, an assigned volume can be switched. For this reason, use of a storage from a remote site by the user who moves around the wide area becomes possible.

In this embodiment, a description was directed to the case where the assigned volume management program 37 is stored in the management server 30 connected to the storage device 100 through the network 40. The assigned volume management program 37 may also be stored in the storage device 100 and the storage device 200.

FIG. 7 is a block diagram showing other embodiment of a network storage system of the present invention.

This embodiment is different from the embodiment shown in FIG. 1 in that a primary and secondary volume switching program 41 and a primary and secondary volume management table 42 as a second address management table are added to the management server 30 and stored in the storage device 36, and that a primary and secondary management table 109 for managing primary and secondary volumes and a primary and secondary volume control device 108 for controlling switching between a primary volume and a secondary volume are added to the storage device 100, and a primary and secondary management table 209 and a primary and secondary volume control device 208 are added to the storage device 200. The volumes 101, 102, and 103 held by the storage device 100 are connected to the volumes 201, 202, and 203 through a copying network 50 such as an IP network, and synchronization is taken between stored data. Synchronization is taken between two types of volumes: primary volumes and secondary volumes. A secondary volume performs backup of a primary volume for each predetermined period, for example. It is assumed herein that data writing and reading are possible for the primary volume, and that only data reading is possible for the secondary volume.

When a request for writing to a primary volume is generated, data written to a secondary volume is later written to the primary volume so as to assure replica of the data, and then control is transferred to the source that has made the write request. Alternatively, after data writing (buffering) has been performed to other volume, control is transferred to the source that has made the write request, and the data written to the other volume is written to a secondary volume asynchronously. Incidentally, the relationship between the primary volume and the secondary volume can be dynamically changed, and the replica of data is created for the volume set as the secondary volume, from the volume set as the primary volume.

FIG. 9 is a table showing an example of a data structure in the primary and secondary management table 109. The primary and secondary management table 109 includes a volume ID 1091 for identifying a volume in the storage device 100, a pair attribute 1092 for indicating the role of the volume in the storage device 100 in data replication, and a pair volume ID 1093, which is the ID of the pair volume, as respective data items thereof.

FIG. 10 is a table showing an example of a data structure in the primary and secondary management table 209. The primary and secondary management table 209 includes a volume ID 2091 for identifying a volume in the storage device 200, a pair attribute 2092 for indicating the role of the volume in the storage device 200 in data replication, and a pair volume ID 2093, which is the ID of the pair volume, as respective data items thereof.

In this embodiment, when the PC 10 transmits to the storage device 100 or storage device 200 a request for acquiring information including the user ID, the transmission source address, and information of a volume to be used, the storage device 100 or 200 transmits a request for verifying assignment of the volume including information of the user ID, transmission source address, the information of the volume to be used, and the request destination address.

When the assigned volume management program 37 of the management server 30 receives the request for verifying assignment of the volume, the assigned volume management program 37 refers to the assigned volume management table 38 and locates the forwarding address from the user ID and the transmission source address. Then, when the forwarding address does not match the request destination address, the management server 30 executes the primary and secondary volume switching program 41, refers to the primary and secondary volume management table 42, switches the volume at the forwarding destination to the primary volume, and then returns the response indicating the forwarding destination for the volume. When the requested volume is the volume 101 and the volume at the forwarding destination is 201, for example, the management server 30 switches the volume 201 at the forwarding destination to the primary volume, and notifies the switched primary volume 201 to the PC 10 as the volume at the forwarding destination. Incidentally, the data structure of the primary and secondary volume management table 42, an example of which is shown in FIG. 8, is constituted from the data items of a volume ID 421, a pair attribute 422 defined in the volume specified by the volume ID, indicating whether the volume is a primary volume or a secondary volume, and a pair volume ID 423, which is the ID of a volume paired with the volume specified by the volume ID.

Figure 11:
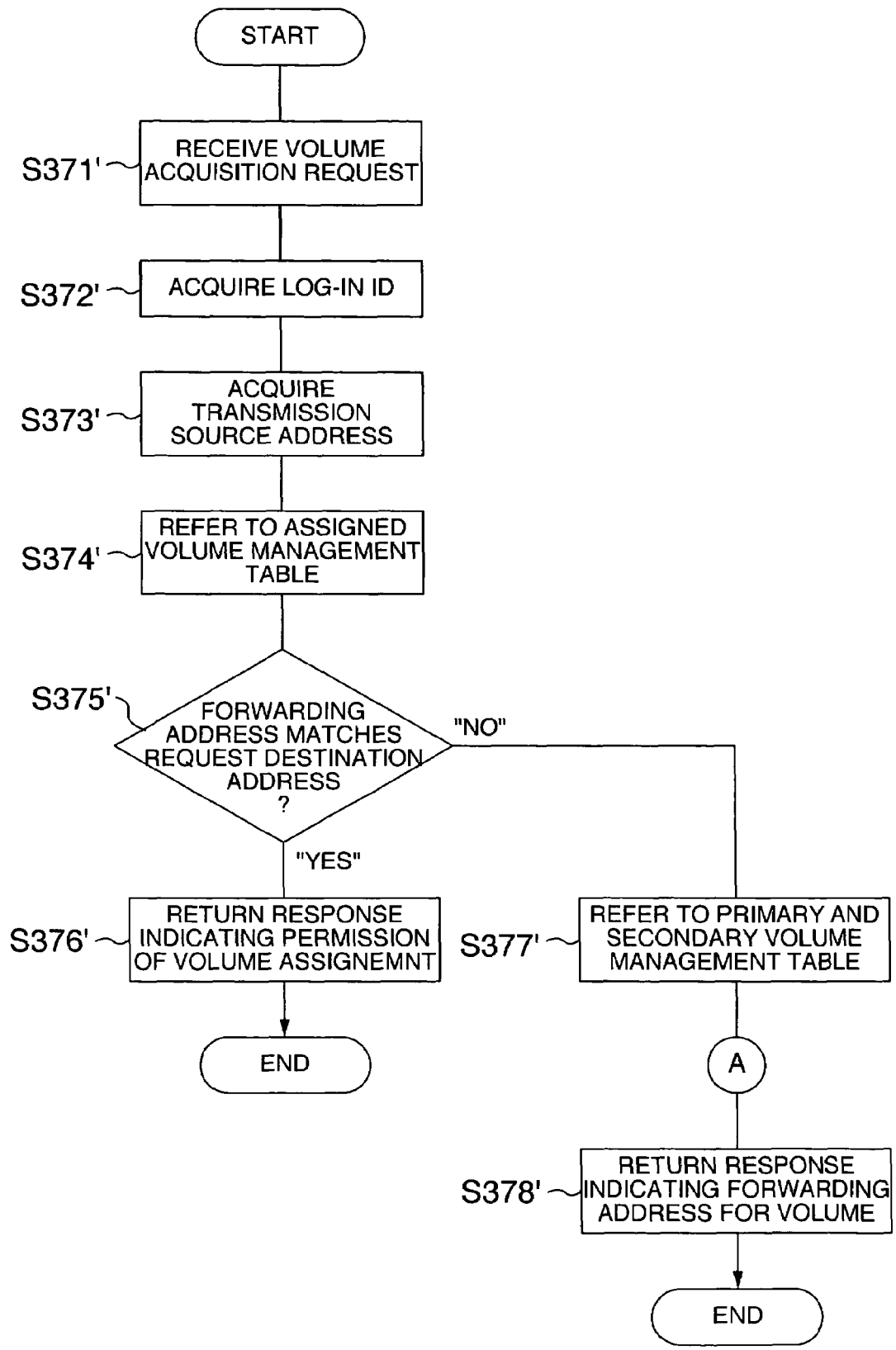
FIG. 11 is a flowchart showing a flow of processing by an assigned volume management program according to the embodiment of the present invention shown in FIG. 7.
Figure 12:
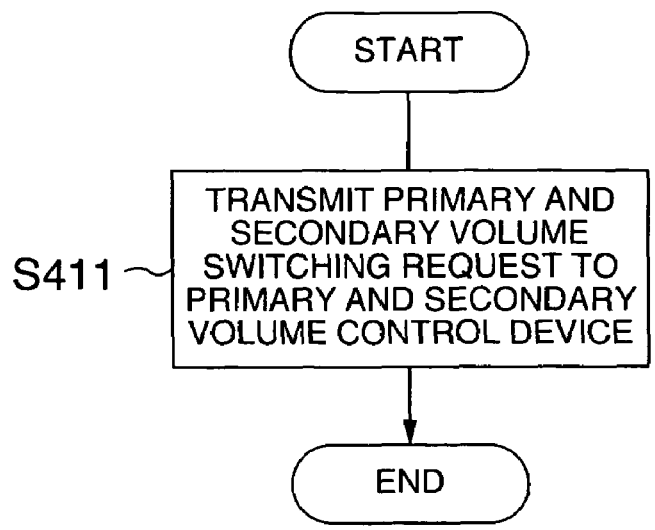
FIG. 12 is a flowchart showing a flow of processing by a primary and secondary volume switching program according to the embodiment of the present invention shown in FIG. 7.
Figure 13:
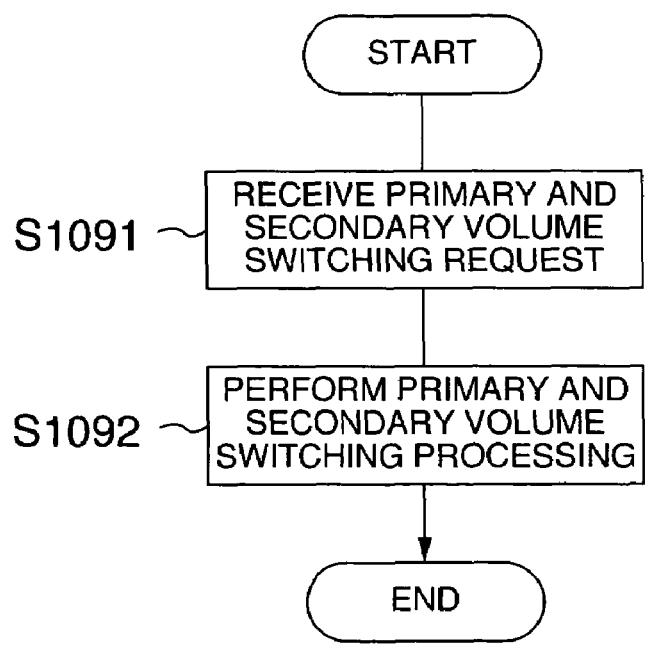
FIG. 13 is a flowchart showing a control procedure of a primary and secondary volume control device according to the embodiment of the present invention shown in FIG. 7.

FIG. 11 is a flowchart showing a processing procedure by the assigned volume management program. FIG. 12 is a flowchart showing a processing procedure by the primary and secondary volume switching program. FIG. 13 is a flowchart showing a control procedure of the primary and secondary volume control device.

The flowchart in FIG. 11 is different from the flowchart in FIG. 6 in that when the forwarding address does not match the request destination address at step S375', the management server 30 refers to the primary and secondary volume management table 42 at step S377', executes processing (A) for switching the requested volume to the primary volume, and then makes a response indicating the forwarding address for the volume at step S378'.

In the processing (A) for switching the requested volume to the primary volume, as shown in FIG. 12, the management server transmits a request for switching between the primary and secondary volumes to the primary and secondary volume control device 108 of the storage device 100 or the primary and secondary volume control device 208 of the storage device 200 so that the volume at the forwarding destination becomes the primary volume and the requested volume becomes the secondary volume, at step S411.

Processing at each of steps S371' to S374' in FIG. 11 is the same as the processing at each of steps S371 to S374 in FIG. 6, respectively, and processing at step S376' in FIG. 11 is the same as the processing at step S376 in FIG. 6.

Then, as shown in FIG. 13, when the primary and secondary volume control device 108 or 208 receives from the management server 30 the request for switching between the primary and secondary volumes at step S1091, the primary and secondary volume control device 108 or 208 performs the processing of primary and secondary volume switching at step S1092. More specifically, the primary and secondary volume control device 108 or 208 rewrites description about the primary and secondary volumes in the pair attribute 1092 or 2092 for data replication in the primary and secondary management table 109 or 209. Further, the primary and secondary volume control device 108 or 208 executes control over the volumes 101 to 103 or 201 to 203 so that the requested volume switched to the secondary volume is write disabled.

According to the embodiment of the present invention described above, when the request for acquiring a volume to which synchronization is taken is generated, the volume assigned to the address at the PC 10 can be used as the primary volume.

In this embodiment, a description was directed to the case where the primary and secondary volume switching program 41 is stored in the management server 30 connected to the storage device 100 or 200 through the network 40. The primary and secondary volume switching program 41 may be stored in the storage device 100 or the storage device 200. The primary and secondary volume switching program 41 may be stored in a device different from the device in which the assigned volume management program 37 is stored.

Figure 14:
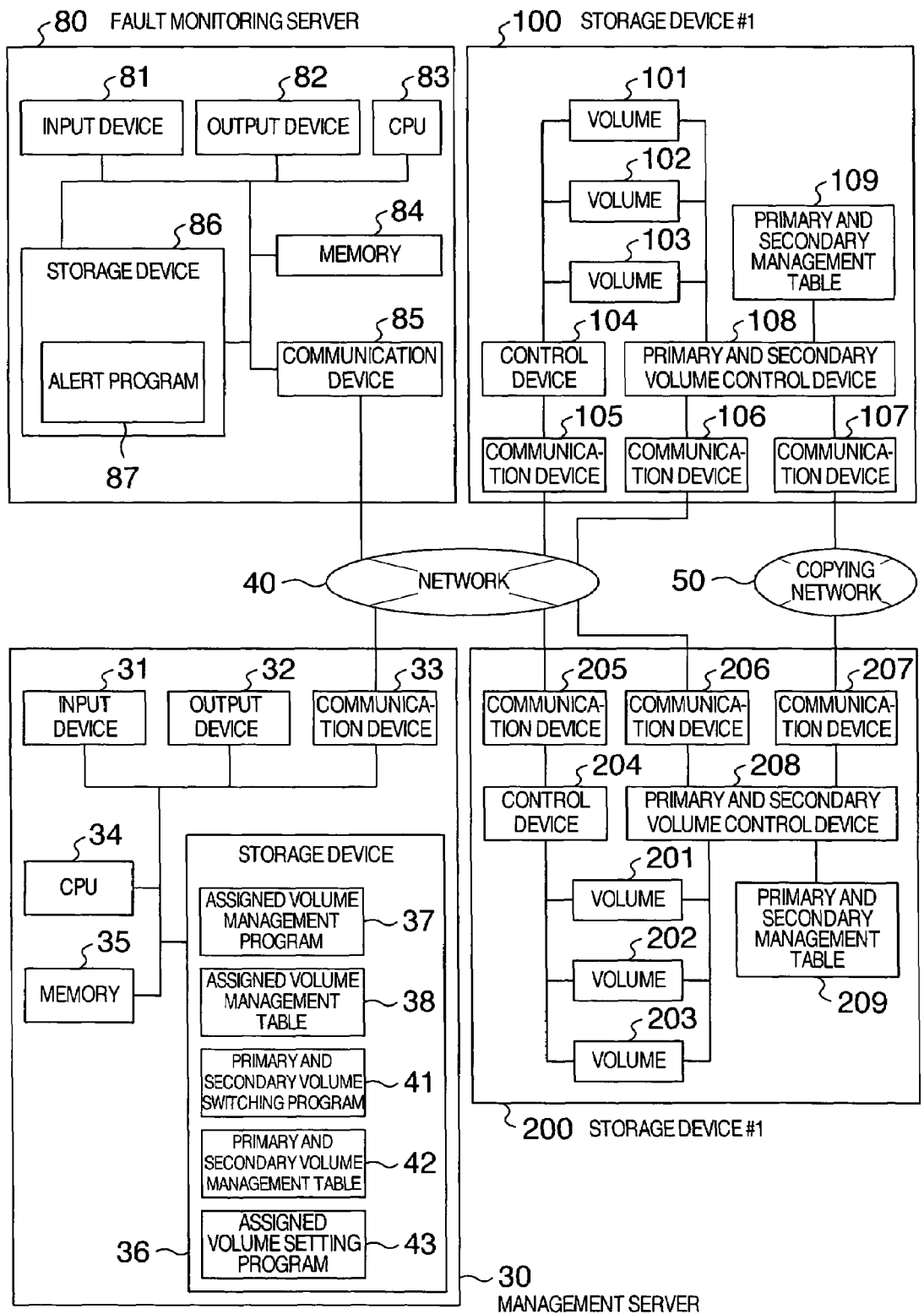
FIG. 14 is a block diagram showing a network storage system according still other embodiment of the present invention.

FIG. 14 is a block diagram showing still other embodiment of a network storage system of the present invention.

This embodiment shown in FIG. 14 is different from the embodiments shown in FIGS. 1 and 7 in that a fault monitoring server 80 having an alert program is added to the network system in FIG. 1 or 7 and that an assigned volume setting program 43 is provided in the management server 30. In this FIG. 14, the PC 10, which is a computer, is omitted.

The fault monitoring server 80 is connected to the system through the network 40, like the management server 30, and storage devices 100 and 200. The assigned volume setting program 43 is the program stored in the storage device 36 of the management server 30, and after read into the memory 35, the assigned volume setting program 43 is executed by the CPU 34. The assigned volume setting program 43 is the program prepared for updating assignments set in the assigned volume management table 38 and the primary and secondary volume management table 42 when a fault occurs.

The fault monitoring server 80 includes an input device 81, an output device 82, a CPU 83, a memory 84, a communication device 85, and a storage device 86. An alert program 87 is the program stored in the storage device 86, and is executed by the CPU after read into the memory 84. The alert program 87 is the program for constantly monitoring the statuses of the network 40 and the storage devices 100 and 200 and notifying the management server 30 on the network 40 of a fault when abnormality is detected.

In this embodiment of the present invention, when the fault monitoring server 80 detects that abnormality has occurred in the network 40 or the storage device 100 or 200, the alert program 87 notifies the management server 30 of the fault. Upon reception of the notification of the fault, the management server 30 changes volume assignment for the network 40, or the storage device 100 and 200 in which the fault occurs into assignment of the other volume for which synchronization is taken, by the assigned volume setting program 43, and then switches the volume subjected to the assignment change into the primary volume by the primary and secondary volume switching program 41.

Figure 15:
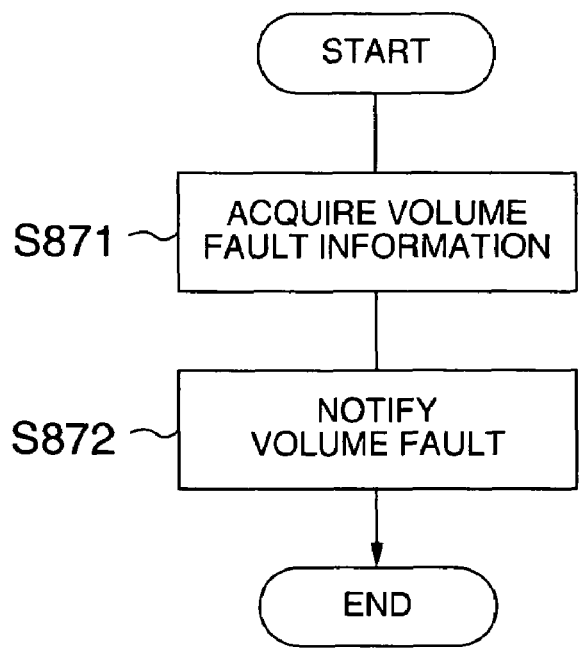
FIG. 15 is a flowchart showing a flow of processing by an alert program according to the embodiment of the present invention shown in FIG. 14.
Figure 16:
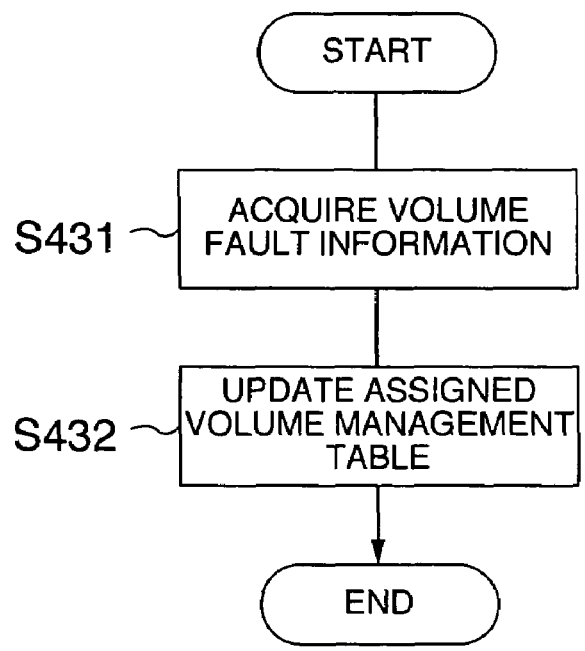
FIG. 16 is a flowchart showing a flow of processing by an assigned volume setting program according to the embodiment of the present invention shown in FIG. 14.

FIG. 15 is a flowchart showing a flow of processing by the alert program. FIG. 16 is a flowchart showing a flow by the assigned volume setting program.

Referring to FIG. 15, when the fault monitoring server 80 detects occurrence of abnormality in the network 40 or the storage device 100 or 200 by the alert program 87, the fault monitoring server 80 acquires information of the fault in the volume such as the address of the storage device, the ID of the volume, and the content of the fault, at step S871. Then, the fault monitoring server 80 issues the notification of the fault in the volume to the management server 30, at step S872.

As shown in FIG. 16, the management server 30 that has received the notification of the fault in the volume at step S431, the management server 30 refers to the assigned volume management table 38 and updates corresponding data items for an entry including the volume with the fault occurred therein at the forwarding address. With regard to updating of the forwarding destination, when a fault has occurred in the paired volume, for example, volume 101 in the primary and secondary volume management table 42 shown in FIG. 8, updating is performed so that data is forwarded to the volume 201, at step S432.

According to this embodiment of the present invention, when abnormality has occurred in the network 40, or storage device 100 or 200, the volume in which the fault has occurred can be prevented from being specified as the forwarding destination.

In this embodiment of the present invention, a description was directed to the case where the assigned volume setting program 43 is stored in the management server 30 connected to the storage devices 100 and 200 through the network 40. The assigned volume setting program 43 may be stored in the storage devices 100 and 200. Alternatively, the assigned volume setting program 43 may be stored in a device other than the device in which the assigned volume management program 37 and the primary and secondary volume switching program 41 are stored. Further, the alert program 87, assigned volume setting program 43, assigned volume management program 37, and primary and secondary volume switching program 41 may be stored in the same device.

The present invention can be used in a network storage system in general for providing a high-performance volume to a user who moves around a wide area.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A storage management device for managing a plurality of volumes used by computers connected to a plurality of storage systems through a network, said plurality of storage systems including disk devices comprising said plurality of volumes, the storage management device comprising:
   a processor;
   an application program executed by the processor, the application program comprising:
   a receiving unit which receives from one of the storage systems a request for accessing one of the volumes,
   wherein the one of the storage systems receives the request for accessing from one of the computers,
   wherein the request for accessing comprises user identification information, a transmission source address, and a destination address of a volume requested to be used,
   wherein connected volume address information of said plurality of volumes connected to the one of the computers is stored in advance in the one of the computers, and
   wherein the one of the computers issues the request for accessing in which an address of a volume accessed at a previous time is set as the destination address of the volume requested to be used;
   an assigning unit which assigns a corresponding one of the volumes based on a position of said one of the computers on the network; and
   an address management table including at least one identification information for identifying a user who uses said one of the volumes, at least one transmission source address used when said one of the computers has transmitted the request for accessing said one of the volumes, at least one forwarding address indicating an address of the corresponding one of the volumes to be used according to the at least one transmission source address, and identification information of the corresponding one of the volumes associated with the at least one forwarding address, as respective data items thereof,
   wherein the assigning unit is configured to refer to the address management table based on the request for accessing from said one of the computers and assign the corresponding one of the volumes corresponding to said one of the computers that has made the request,
   wherein when the assigning unit has received from said one of the computers a request for verifying storage assignment including the user identification information, the transmission source address, and the destination address of said one of the volumes requested by said one of the computers through said one of the volumes, the assigning unit refers to the address management table, locates a forwarding address corresponding to the user identification information and the transmission source address included in the request for verifying the storage assignment,
   wherein when the located forwarding address corresponding to the user identification information and the transmission source address included in the request for verifying the storage assignment matches the destination address of said one of the volumes requested by said one of the computers, the assigning unit returns to said one of the computers that made the request a response indicating permission of assignment of said one of the volumes, and
   wherein when the located forwarding address corresponding to the user identification information and the transmission source address included in the request for verifying the storage assignment does not match the destination address of said one of the volumes requested by said one of the computers, the assigning unit returns to said one of the computers that made the request a response providing the located forwarding address corresponding to the user identification information and the transmission source address included in the request for verifying the storage assignment, and said one of the computers updates the connected volume address information, based on the located forwarding address provided to said one of the computers.

2. The storage management device according to claim 1, wherein when the located forwarding address does not match the destination address of said one of the volumes requested by said one of the computers, the assigning unit refers to a second address management table storing a pair attribute indicating whether an assigned volume is a primary volume or a secondary volume, the secondary volume being a replica of the primary volume, and controls the storage system to switch the assigned volume to the primary volume and the other pair volume paired with the assigned volume to the secondary volume.

3. The storage management device according to claim 2, wherein the assigning unit sets the volume switched to the secondary volume to be write disabled.

4. The storage management device according to claim 2, further comprising:
   a second receiving unit which receives notification of occurrence of a fault in the network or one of said plurality of storage systems, and a switching unit which switches the assigned volume to an interchangeable volume by referring to the second address management table, access to the assigned volume being disabled due to the occurrence of the fault.

5. A storage network system, comprising:
   one or more storage systems; and
   computers connected to a storage management device through a network, wherein the storage management device includes an address management table, assignment of volumes in the storage systems being defined in advance in the address management table according to an access position of each of the computers on the network and addresses of the volumes being stored in the address management table,
   wherein the storage management device refers to the address management table based on an access request from one of the storage systems,
   wherein the one of the storage systems receives the access request from one of the computers,
   wherein the access request comprises user identification information, a transmission source address, and a destination address of a volume requested to be used,
   wherein connected volume address information of said plurality of volumes connected to the one of the computers is stored in advance in the one of the computers, wherein the one of the computers issues the access request in which an address of a volume accessed at a previous time is set as the destination address of the volume requested to be used, and wherein the storage management device assigns one of the volumes corresponding to said one of the computers that has made the access request, wherein when the storage management device has received from said one of the computers a request for verifying storage assignment including the user identification information, the transmission source address, and the destination address of said one of the volumes requested by said one of the computers through said one of the volumes, the storage management device refers to the address management table, locates a forwarding address corresponding to the user identification information and the transmission source address included in the request for verifying the storage assignment, wherein when the located forwarding address corresponding to the user identification information and the transmission source address included in the request for verifying the storage assignment matches the destination address of said one of the volumes requested by said one of the computers, an assigning unit returns to said one of the computers that made the request a response indicating permission of assignment of said one of the volumes, and wherein when the located forwarding address corresponding to the user identification information and the transmission source address included in the request for verifying the storage assignment does not match the destination address of said one of the volumes requested by said one of the computers, the assigning unit returns to said one of the computers that made the request a response providing the located forwarding address corresponding to the user identification information and the transmission source address included in the request for verifying the storage assignment, and said one of the computers updates the connected volume address information, based on the forwarding address provided to said one of the computers.

6. A storage management method of a storage management device in a storage network system with one or more storage systems and computers connected to the storage management device through a network, the one or more storage systems including disk devices comprising a plurality of volumes, the method comprising:

receiving an access request from one of the storage systems connected through the network, wherein the one of the storage systems receives the access request from one of the computers, wherein the access request comprises user identification information, a transmission source address, and a destination address of a volume requested to be used, wherein connected volume address information of said plurality of volumes connected to the one of the computers is stored in advance in the one of the computers, and wherein the one of the computers issues the access request in which an address of a volume accessed at a previous time is set as the destination address of the volume requested to be used;

referring to an address management table, assignment of the volumes in the storage systems being defined in advance in the address management table according to an access position of each of the computers on the network and addresses of the volumes being stored in the address management table; and referring to the address management table based on the access request from said one of the computers, and assigning one of the volumes corresponding to said one of the computers that has made the access request, wherein when the storage management device has received from said one of the computers a request for verifying storage assignment including the user identification information, the transmission source address, and the destination address of said one of the volumes requested by said one of the computers through said one of the volumes, the storage management device refers to the address management table, locates a forwarding address corresponding to the user identification information and the transmission source address included in the request for verifying the storage assignment, wherein when the forwarding address corresponding to the user identification information and the transmission source address included in the request for verifying the storage assignment matches the destination address of said one of the volumes requested by said one of the computers, an assigning unit returns to said one of the computers that made the request a response indicating permission of assignment of said one of the volumes, and wherein when the forwarding address corresponding to the user identification information and the transmission source address included in the request for verifying the storage assignment does not match the destination address of said one of the volumes requested by said one of the computers, the assigning unit returns to said one of the computers that made the request a response providing the forwarding address corresponding to the user identification information and the transmission source address included in the request for verifying the storage assignment, and said one of the computers updates the connected volume address information, based on the forwarding address of the volume provided to said one of the computers.

7. The storage management method according to claim 6, further comprising:

referring to a second address management table storing a pair attribute indicating whether said one of the volumes is a primary volume or a secondary volume between the primary volume and the secondary volume subject to synchronization, when assigning said one of the volumes; and performing switching between the primary volume and the secondary volume, the secondary volume being a replica of the primary volume, switching the assigned volume to the primary volume and the other pair volume paired with the assigned volume to the secondary volume, and setting a storage content of the secondary volume thus obtained by switching to be write disabled.

8. The storage management method according to claim 7, further comprising:

receiving notification of occurrence of a fault in the network or one of the storage systems and switching the assigned volume to an interchangeable volume by referring to the second address management table, access to the assigned volume being disabled due to the occurrence of the fault.

9. A program embedded in a memory used in a storage management device connected to one or more storage systems and computers through a network, the one or more storage systems including disk devices comprising a plurality of volumes, the program causing a computer of the storage management device to execute processing of:

receiving an access request from one of the storage systems connected through the network, wherein the one of the storage systems receives the access request from one of the computers, wherein the access request comprises user identification information, a transmission source address, and a destination address of a volume requested to be used, wherein connected volume address information of said plurality of volumes connected to the one of the computers is stored in advance in the one of the computers, and wherein the one of the computers issues the access request in which an address of a volume accessed at a previous time is set as the destination address of the volume requested to be used;

referring to an address management table, assignment of the volumes in the storage systems being defined in advance in the address management table according to an access position of each of the computers on the network and addresses of the volumes being stored in the address management table; and referring to the address management table based on the access request from said one of the computers, and assigning one of the volumes corresponding to said one of the computers that has made the access request, wherein when the storage management device has received from said one of the computers a request for verifying storage assignment including the user identification information, the transmission source address, and the destination address of said one of the volumes requested by said one of the computers through said one of the volumes, the storage management device refers to the address management table, locates a forwarding address corresponding to the user identification information and the transmission source address included in the request for verifying the storage assignment, wherein when the located forwarding address corresponding to the user identification information and the transmission source address included in the request for verifying the storage assignment matches the destination address of said one of the volumes requested by said one of the computers, an assigning unit returns to said one of the computers that made the request a response indicating permission of assignment of said one of the volumes, and wherein when the located forwarding address corresponding to the user identification information and the transmission source address included in the request for verifying the storage assignment does not match the destination address of said one of the volumes requested by said one of the computers, the assigning unit returns to said one of the computers that made the request a response providing the located forwarding address, and said one of the computers updates the connected volume address information, based on the located forwarding address provided to said one of the computers.

10. The program according to claim 9, for causing the computer of the storage management device to execute processing of:

referring to a second address management table storing a pair attribute indicating whether said one of the volumes is a primary volume or a secondary volume between the primary volume and the secondary volume subject to synchronization, when assigning said one of the volumes; and performing switching between the primary volume and the secondary volume, the secondary volume being a replica of the primary volume, switching the assigned volume to the primary volume and the other pair volume paired with the assigned volume to the secondary volume, and setting a storage content of the secondary volume thus obtained by switching to be write disabled.

11. The program according to claim 10, for causing the computer of the storage management device to execute processing of:

receiving notification of occurrence of a fault in the network or the storage systems, and switching the assigned volume to an interchangeable volume by referring to the second address management table, access to the assigned volume being disabled due to the occurrence of the fault.

* * * * *